United States Patent
Shimizu

(10) Patent No.: US 9,304,718 B2
(45) Date of Patent: Apr. 5, 2016

(54) APPARATUS, METHOD, AND PROGRAM PRODUCT PROVIDING SPECIFIC VERSION OF COLOR PROFILE, ACCORDING TO PRINT JOB ATTRIBUTES, TO EACH CLIENT TO BE ASSOCIATED WITH VERSION INDEPENDENT UNIFIED NAME

(71) Applicant: FUJIFILM Corporation, Tokyo (JP)

(72) Inventor: Ryo Shimizu, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/571,459

(22) Filed: Dec. 16, 2014

(65) Prior Publication Data

US 2015/0178021 A1   Jun. 25, 2015

(30) Foreign Application Priority Data

Dec. 25, 2013   (JP) ................. 2013-267804

(51) Int. Cl.
*G06F 3/12* (2006.01)
*H04N 1/60* (2006.01)

(52) U.S. Cl.
CPC ............ *G06F 3/1204* (2013.01); *G06F 3/1205* (2013.01); *G06F 3/1253* (2013.01); *G06F 3/1257* (2013.01); *G06F 3/1285* (2013.01); *H04N 1/6052* (2013.01); *H04N 1/6066* (2013.01); *H04N 2201/0082* (2013.01)

(58) Field of Classification Search
None
See application file for complete search history.

(56) References Cited

U.S. PATENT DOCUMENTS

| | | | | |
|---|---|---|---|---|
| 6,091,518 A * | 7/2000 | Anabuki | ................. | 358/518 |
| 6,922,266 B2 * | 7/2005 | Hiramatsu | ................. | 358/518 |
| 7,532,349 B2 * | 5/2009 | Arakawa | ................. | 358/1.16 |
| 2002/0030840 A1 * | 3/2002 | Itaki et al. | ................. | 358/1.13 |
| 2002/0051180 A1 * | 5/2002 | Shimbori et al. | ................. | 358/1.15 |
| 2002/0118380 A1 * | 8/2002 | Krueger et al. | ................. | 358/1.9 |
| 2002/0191214 A1 * | 12/2002 | Shimazaki | ................. | 358/1.15 |
| 2011/0023054 A1 * | 1/2011 | Yamazaki | ............ | G06F 3/1204 719/321 |
| 2012/0194592 A1 * | 8/2012 | Bhaumik et al. | ................. | 347/15 |
| 2013/0293904 A1 * | 11/2013 | Shimizu | ................. | 358/1.9 |

FOREIGN PATENT DOCUMENTS

JP   4356975 B   11/2009

OTHER PUBLICATIONS

Konica Minolta Universal Printer Driver (UPD), Jul. 2009, Konica Minolta.*

* cited by examiner

*Primary Examiner* — Scott A Rogers
(74) *Attorney, Agent, or Firm* — Sughrue Mion, PLLC

(57) ABSTRACT

There are provided a profile providing apparatus, a profile providing system, a profile providing method, and a profile providing program that allow providing a profile of the appropriate version while reducing the burden relevant to a setting on the client side. A version selection unit, which selects one of a plurality of versions stored in a profile database as a specific version, and a transmission processing unit, which transmits a profile of the selected specific version to each client apparatus so as to be associated with a unified name that does not depend on the version, are provided.

9 Claims, 12 Drawing Sheets

APPARATUS, METHOD, AND PROGRAM PRODUCT PROVIDING SPECIFIC VERSION OF COLOR PROFILE, ACCORDING TO PRINT JOB ATTRIBUTES, TO EACH CLIENT TO BE ASSOCIATED WITH VERSION INDEPENDENT UNIFIED NAME

The present application claims priority under 35 U.S.C. §119 to Japanese Patent Application No. 2013-267804, filed on Dec. 25, 2013, all of which are hereby expressly incorporated by reference into the present application.

BACKGROUND OF THE INVENTION

1. Field of the Invention

The present invention relates to a profile providing apparatus, a profile providing system, a profile providing method, and a non-transitory computer readable recording medium for providing a color profile to at least one client apparatus.

2. Description of the Related Art

Recently, in the field of printing, the workflow of printing process is entirely digitized with the spread of DeskTop Publishing (DTP) or Computer To Plate (CPT). For example, various techniques for centrally managing and providing a color profile (hereinafter, simply referred to as a "profile"), which is used for the color conversion process, have been proposed. JP4356975B (paragraphs [0047] to [0052]) proposes a method of managing a plurality of types of profiles on the server side and downloading one type of profile selected through the user interface on the client side.

SUMMARY OF THE INVENTION

Incidentally, depending on a printing company, in order to unify the color reproduction characteristics in each factory in the group, profiles (in particular, target profiles) may be centrally managed. For example, in order to reflect in a timely manner the trends of standards or the improvements in the performance of the printing apparatus, managed profiles may be updated as necessary.

In the method disclosed in JP4356975B (paragraphs [0047] to [0052]), however, there is no mention of profile version management. For example, when providing a profile in a state where different names are given to the respective versions, the client should change the setting of the profile whenever a version change occurs. This has been very troublesome work for the operator.

The invention has been made in order to solve the aforementioned problem, and it is an object of the invention to provide a profile providing apparatus, a profile providing system, a profile providing method, and a profile providing program that allow providing a profile of the appropriate version while reducing the burden relevant to a setting on the client side.

According to an aspect of the invention, there is provided a profile providing apparatus for providing a color profile to at least one client apparatus. The profile providing apparatus includes: a profile database in which the color profile is stored for each version; a version selection unit that selects one of a plurality of versions stored in the profile database as a specific version; and a transmission processing unit that transmits the color profile of the specific version selected by the version selection unit to each client apparatus so as to be associated with a unified name that does not depend on the version.

Thus, since the version selection unit, which selects one of the plurality of versions stored in the profile database as a specific version, and the transmission processing unit, which transmits the color profile of the selected specific version to each client apparatus so as to be associated with a unified name that does not depend on the version, are provided, it is possible to acquire and set the profile with a unified name without being aware of the version difference on the client side. As a result, it is possible to provide a profile of the appropriate version while reducing the burden on the setting on the client side.

Preferably, the version selection unit selects the specific version according to attributes of a print job to which the color profile is to be applied.

Preferably, the version selection unit selects a latest version as the specific version when the print job is newly executed.

Preferably, when the print job has been executed in the past, the version selection unit selects a version applied during the execution as the specific version.

Preferably, the version selection unit selects the specific version according to operational conditions for each of the versions set in advance.

According to another aspect of the invention, there is provided a profile providing system including: the profile providing apparatus described above; and at least one client apparatus capable of communicating with the profile providing apparatus.

According to still another aspect of the invention, there is provided a profile providing method for providing a color profile to at least one client apparatus using a profile providing apparatus having a profile database in which the color profile is stored for each version. The profile providing method includes: selecting one of a plurality of versions stored in the profile database as a specific version; and transmitting the color profile of the selected specific version to each client apparatus so as to be associated with a unified name that does not depend on the version.

According to still another aspect of the invention, there is provided a profile providing program for providing a color profile to at least one client apparatus using a profile providing apparatus having a profile database in which the color profile is stored for each version. The profile providing program causes a computer to execute: selecting one of a plurality of versions stored in the profile database as a specific version; and transmitting the color profile of the selected specific version to each client apparatus so as to be associated with a unified name that does not depend on the version.

According to still another aspect of the invention, there is provided a non-transitory computer readable recording medium on which the profile providing program described above is recorded.

According to the profile providing apparatus, the profile providing system, the profile providing method, and the profile providing program of the invention, one of the plurality of versions stored in the profile database is selected as a specific version, and the color profile of the selected specific version is transmitted to each client apparatus so as to be associated with a unified name that does not depend on the version. Therefore, it is possible to acquire and set the profile with a unified name without being aware of the version difference on the client side. As a result, it is possible to provide a profile of the appropriate version while reducing the burden on the setting on the client side.

DESCRIPTION OF THE PREFERRED EMBODIMENTS

Hereinafter, a profile providing method according to the invention will be described in detail with reference to the accompanying diagrams by way of appropriate embodiments in relation to a profile providing apparatus, a profile providing system, and a profile providing program to realize the profile providing method.

First Embodiment

First, a profile providing system 10 according to a first embodiment will be described with reference to FIGS. 1 to 9.

<Overall Configuration Diagram of the Profile Providing System 10>

Figure 1:
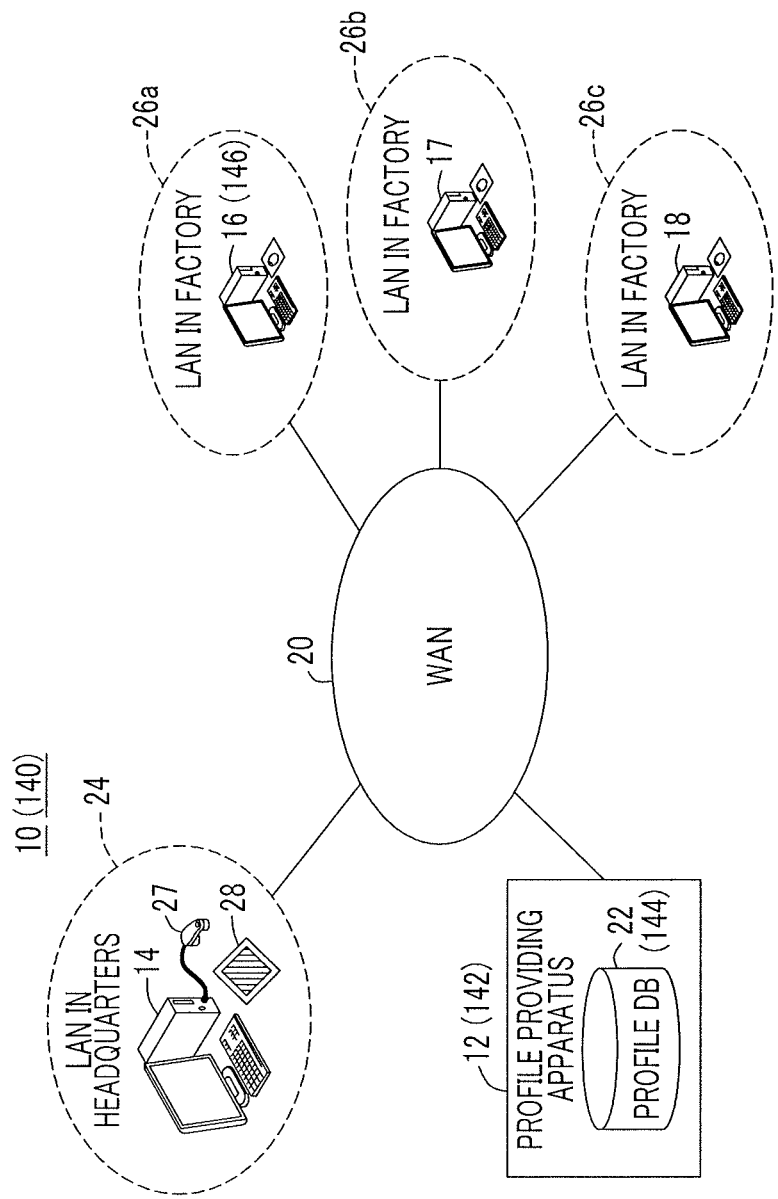
FIG. 1 is a diagram showing the overall configuration of a profile providing system according to a first embodiment.

FIG. 1 is a diagram showing the overall configuration of the profile providing system 10 according to the first embodiment. The profile providing system 10 is configured to include basically a profile providing apparatus 12, a client apparatus 14 within the headquarters, and client apparatuses 16, 17, and 18 in respective factories. Here, the profile providing apparatus 12, the client apparatus 14, and the client apparatuses 16 to 18 are connected to each other through a network 20 (in this example shown in FIG. 1, wide area network (WAN)).

Figure 3:
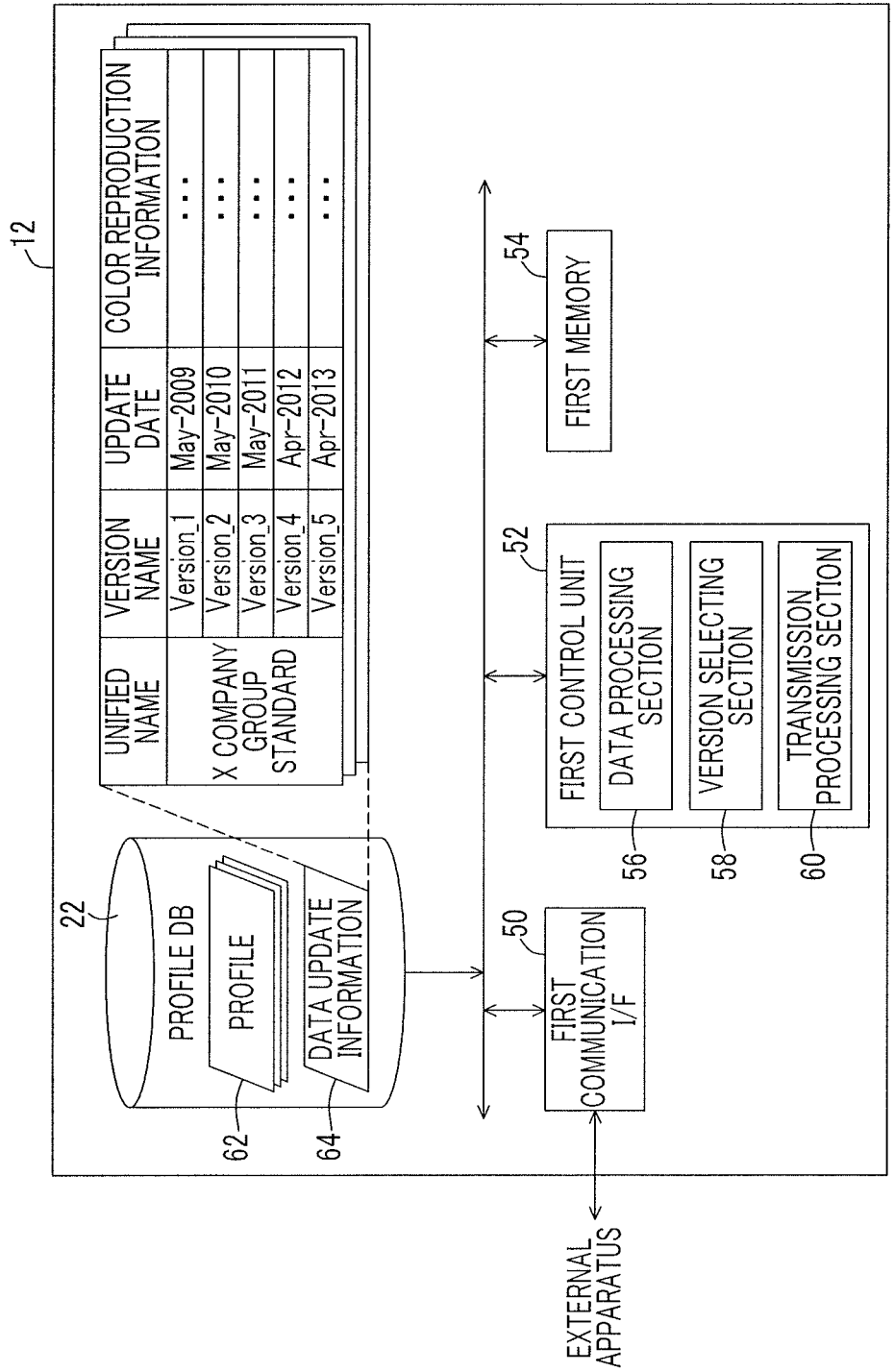
FIG. 3 is an electrical block diagram of the profile providing apparatus according to the first embodiment.

The profile providing apparatus 12 is a server that manages a color profile (hereinafter, referred to as a profile 62; FIG. 3) to be used for the color conversion process and that provides the profile 62 in response to the request from the client apparatus 16 or the like. In the profile providing apparatus 12, a database of profiles (profile database; hereinafter referred to as a profile DB 22) is built.

For example, an X company that is a printing company owns four facilities that are geographically distant from each other, specifically, headquarters, factory A, factory B, and factory C. The authorized operator can access the profile providing apparatus 12 through the client apparatus 14 belonging to a local area network (LAN) in headquarters 24 that is built in the headquarters. In addition, a specific operator can access the profile providing apparatus 12 through the client apparatus 16 (17, 18) belonging to a LAN in factory 26a (26b, 26c) built in the factory (factory B, factory C).

Incidentally, a colorimeter 27 for measuring the color of a measurement target (including a color chart 28) is connected to the client apparatus 14. The client apparatus 14 can generate the profile 62 including a color conversion table based on the correspondence relationship between the colors of color patches (not shown) that form the color chart 28. Here, the correspondence relationship between the colors means a correspondence relationship between the apparatus-dependent color value (for example, CMYK), which depends on the type of each color reproduction apparatus, and the apparatus-independent color value (for example, L*a*b*) that does not depend on the type of each color reproduction apparatus.

<Block Diagram of a Printed Matter Production System 30>

Figure 2:
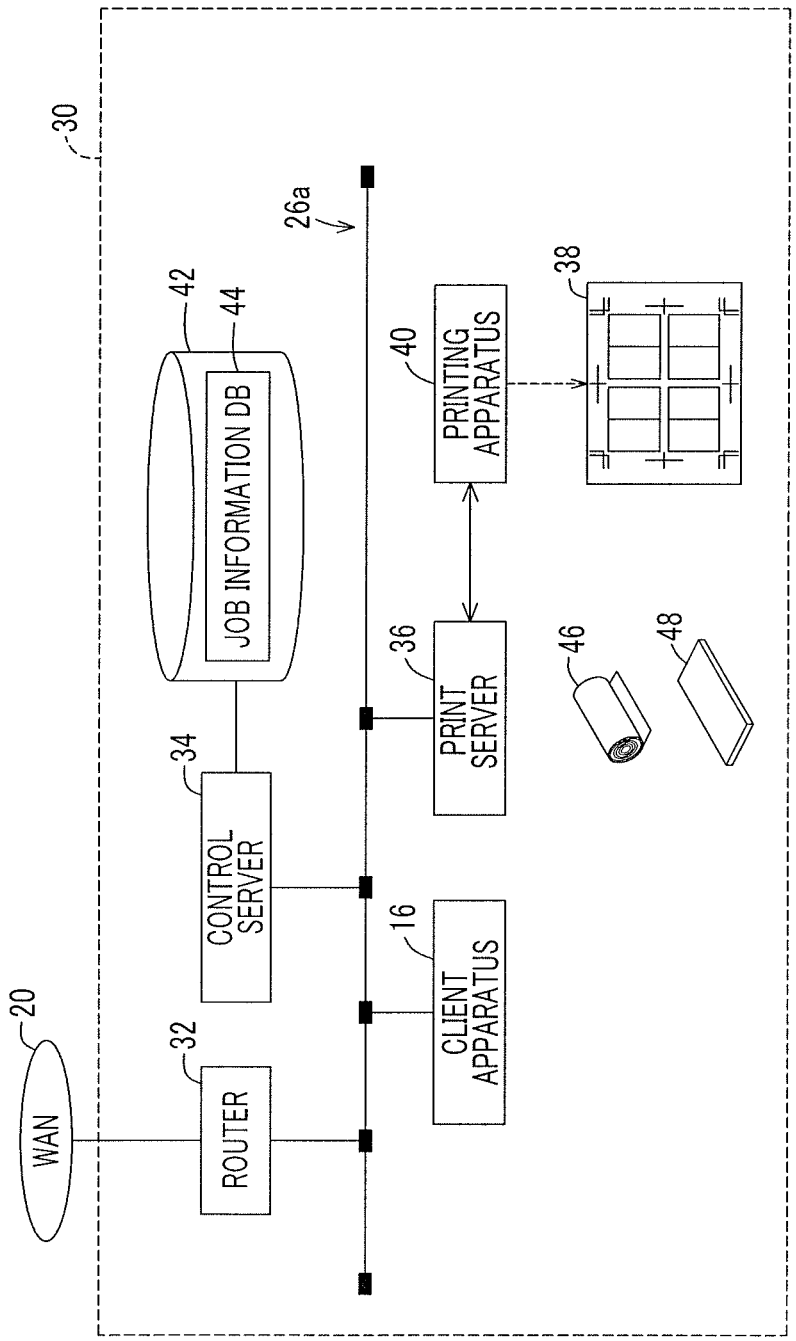
FIG. 2 is a diagram showing the configuration of a printed matter production system including a client apparatus shown in FIG. 1.

FIG. 2 is a diagram showing the configuration of the printed matter production system 30 including the client apparatus 16 shown in FIG. 1. Here, the printed matter production system 30 is a form of a system that is built using the LAN in factory 26a, and any apparatus configuration can be adopted without being limited to the example shown in FIG. 2.

Not only the client apparatus 16 (refer to FIG. 1) but also a router 32 that is a device for relaying connection with the network 20, a control server 34 accessible through the network 20 from each terminal apparatus (not shown), a print server 36 having a print processing function, and a printing apparatus 40 that can form a printed matter 38 based on output data from the print server 36 are provided in the printed matter production system 30.

The control server 34 is an apparatus that forms the core of workflow management in the printed matter production system 30. The control server 34 is communicably connected to the client apparatus 16 and the print server 36 through the LAN in factory 26a. In addition, the control server 34 may be communicably connected to each terminal apparatus (not shown) that the designer or the work company has through the router 32 and the network 20.

In addition, a storage device 42 that can store various kinds of data relevant to the workflow is connected to the control server 34. For example, content data, output data (for example, prepress data, printing-plate data, or calibration data), print job information (for example, a job ticket), and color sample data are stored in the storage device 42. In this example shown in FIG. 2, a database (hereinafter, referred to as a job information DB 44) relevant to the print job information is built in the storage device 42.

The client apparatus 16 is an apparatus that can create data (page data) in units of a page by performing pre-flight processing on the content data configured to include characters, figures, designs, and photographs. In addition, the client apparatus 16 performs imposition processing according to the designated binding method or paper folding method while referring to the tag information of the job ticket.

The print server 36 performs raster image processing (RIP) on the prepress data subjected to the imposition processing, and supplies the obtained output data to the printing apparatus 40.

The printing apparatus 40 outputs the printed matter 38, in which an image is formed on a print medium 46, based on the output data supplied from the print server 36. Types of the print medium 46 include not only paper, such as synthetic paper, cardboard, and aluminum vapor deposition paper, but also resin such as vinyl chloride PET (polyethylene terephthalate), tarpaulin, and metal sheets.

When the printing apparatus 40 is a proof printer, it is possible to use a direct digital color proofer (DDCP), an ink jet color proofer, a low-resolution color laser printer (electrophotographic method) or an ink jet printer, or the like.

When the printing apparatus 40 is a relief printer, the printed matter 38 is output in which an image is formed on the print medium 46 by depositing ink through a printing plate 48 and an intermediate transfer member (not shown).

When the printing apparatus 40 is a digital printer, it is possible to directly output the printed matter 38 without generating the printing plate 48. As a digital printer, it is possible to use an ink jet printer, a wide format printer, an ink jet color proofer, a color laser printer, and the like.

<Electrical Block Diagram of the Profile Providing Apparatus 12>

FIG. 3 is an electrical block diagram of the profile providing apparatus 12 according to the first embodiment. The profile providing apparatus 12 is a computer including not only the profile DB 22 (refer to FIG. 1) but also a first communication I/F 50, a first control unit 52, and a first memory 54 (storage medium).

The first communication I/F 50 is an interface for transmission and reception of an electrical signal to and from an external apparatus. Through the first communication I/F 50, the profile providing apparatus 12 can transmit the desired profile 62 to the client apparatuses 16 to 18 (refer to FIG. 1), and can receive the latest profile 62 from the client apparatus 14 (refer to FIG. 1).

The first control unit 52 is an information processing device (so-called processor), such as a central processing unit (CPU). The first control unit 52 reads and executes a program stored in the first memory 54, thereby realizing various functions of a data processing section 56 that performs data processing, such as addition, deletion, updating, and reading of the profile 62 and data update information 64, a version selecting section 58 that selects one of a plurality of versions stored in the profile DB 22, and a transmission processing section 60 that transmits the profile 62 to a requestor (client apparatus 16).

The first memory 54 stores programs, data, and the like required when the first control unit 52 controls each constituent component. The first memory 54 may be a non-transitory and computer-readable storage medium. Here, the computer-readable storage media is portable media, such as a magneto-optical disc, a ROM, a CD-ROM, and a flash memory, and a storage device, such as a hard disk built in the computer system. In addition, the storage media may hold a program dynamically for a short time, or may hold a program for a fixed period of time.

The profile DB 22 is a collection of data that is stored by matching the profile 62 supplied from the client apparatus 14 (refer to FIG. 1) with identification information (including version names). Unified names, version names, update date, and color reproduction information (for example, evaluation information including the color reproduction error) are included in the record that is a structural unit of the data update information 64. In this example shown in FIG. 3, for the profile 62 whose unified name is "X company group standard", a state is shown in which five versions are already registered.

<Electrical Block Diagram of the Client Apparatus 16>

Figure 4:
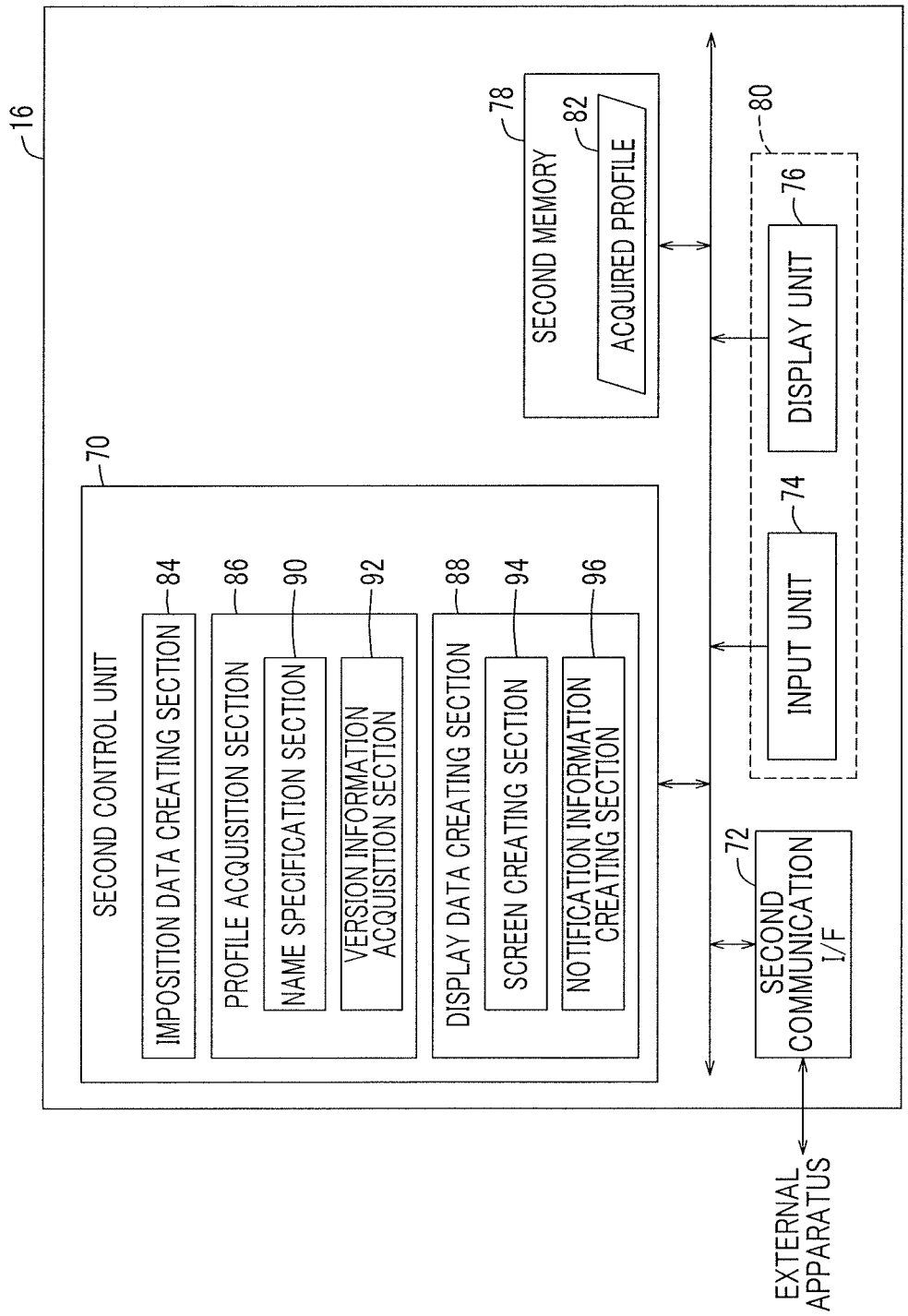
FIG. 4 is an electrical block diagram of the client apparatus according to the first embodiment.

FIG. 4 is an electrical block diagram of the client apparatus 16 according to the first embodiment. The client apparatus 16 is a computer including a second control unit 70, a second communication I/F 72, an input unit 74, a display unit 76, and a second memory 78. As other client apparatuses 14, 17, and 18, various forms having the same configuration as that described above or a different configuration from that described above may be adopted.

The second communication I/F 72 is an interface for transmission and reception of an electrical signal to and from an external apparatus. Through the second communication I/F 72, the client apparatus 16 can transmit a signal requesting the profile 62 to the profile providing apparatus 12 (refer to FIG. 1), and can receive the profile 62 from the profile providing apparatus 12 (refer to FIG. 1).

The input unit 74 is various input devices, such as a mouse, a trackball, a keyboard, and a touch sensor. The display unit 76 is an output device that adopts various methods including a liquid crystal, organic electro-luminescence (EL), and a cathode ray tube (CRT). Here, a user interface unit 80 capable of freely changing the setting of the profile 62 is realized by combining the input function of the input unit 74 and the display function of the display unit 76.

The second memory 78 stores programs, data, and the like required when the second control unit 70 controls each constituent component. Similar to the first memory 54 (refer to FIG. 3), the second memory 78 may be a non-transitory and computer-readable recording medium. In this example shown in FIG. 4, an acquired profile 82 that is provided from the profile providing apparatus 12 is stored.

Similar to the first control unit 52, the second control unit 70 is an information processing device, such as a CPU. The second control unit 70 reads and executes a program stored in the second memory 78, thereby realizing the functions of an imposition data creating section 84 that creates imposition data by performing known imposition processing, a profile acquisition section 86, and a display data creating section 88.

The profile acquisition section 86 acquires the profile 62 of the desired name and version from the profile providing apparatus 12. Specifically, the profile acquisition section 86 includes a name specification section 90 that designates the name of the profile 62 (more specifically, a unified name) and a version information acquisition section 92 that acquires information (hereinafter, referred to as version information) by which a version to be acquired can be specified.

The display data creating section 88 includes a screen creating section 94 that creates a setting screen 100 (refer to FIG. 7) and a check screen 120 (refer to FIG. 8) and a notification information creating section 96 that creates visible information (hereinafter, referred to as notification information) for notifying the operator of the attributes of the print job that is an object to be executed.

<Operation of the Profile Providing System 10>

The profile providing system 10 according to the first embodiment is configured as described above. Next, the operations of the profile providing apparatus 12 shown in FIG. 3 and the client apparatus 16 shown in FIG. 4 will be described in detail with reference mainly to the sequence diagram of FIGS. 5 and 6.

(1. Process of Registering the Profile 62)

Figure 5:
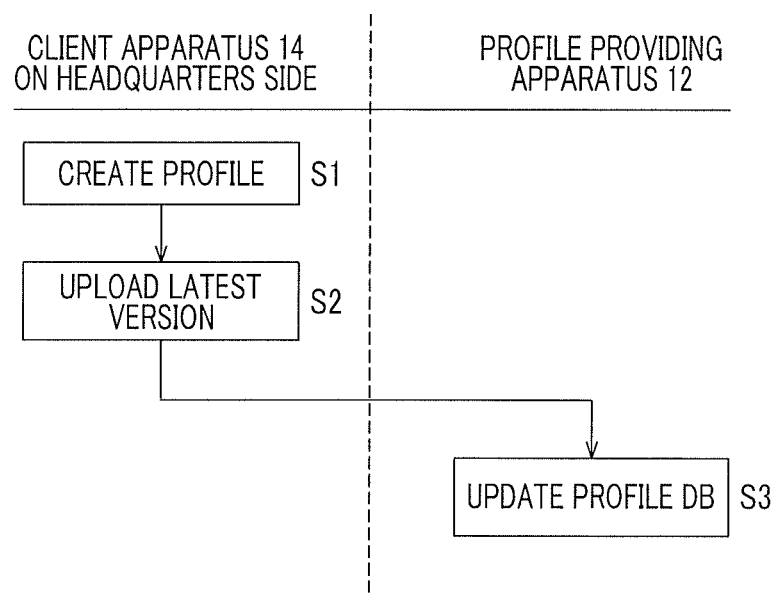
FIG. 5 is a sequence diagram relevant to the process of registering a profile.

First, an operation relevant to the process of registering the profile 62 will be described with reference to the sequence diagram shown in FIG. 5.

In step S1, the client apparatus 14 (refer to FIG. 1) on the headquarters side creates the profile 62, which is the "standard of color reproduction characteristics" in the X company group based on the colorimetric result of the color chart 28 using the colorimeter 27. In addition, since a method of creating the profile 62 (more specifically, a color conversion table) is known, explanation thereof will be omitted.

In step S2, the client apparatus 14 on the headquarters side uploads the profile 62 created in step S1, as the latest version (Version_5) of the unified name "X company group standard", to the profile providing apparatus 12. Then, the profile providing apparatus 12 acquires the profile 62 through the LAN in headquarters 24 (refer to FIG. 1), the network 20 (refer to FIG. 1), and the first communication I/F 50 (refer to FIG. 3).

In step S3, the profile providing apparatus 12 newly registers the profile 62 acquired in step S2 to update the profile DB 22. Specifically, the data processing section 56 adds the latest profile 62, and updates the record of the data update information 64. As a result, a version name, update date, and color reproduction information regarding "Version_5" are newly added to the data update information 64 (refer to FIG. 3) in addition to "Version_1" to "Version_4" already recorded. Thus, the operation relevant to the process of registering the profile 62 is ended.

(2. Process of Providing the Profile 62)

Second, an operation relevant to the process of providing the profile 62 will be described with reference to the sequence diagram shown in FIG. 6.

In step S11, the client apparatus 16 on the factory side acquires print job information that is an object to be executed. Prior to acquisition, the client apparatus 16 transmits a signal requesting the print job information to the control server 34 (refer to FIG. 2) in response to a predetermined operation of the operator as a user. Then, the control server 34 acquires a piece of print job information from the job information DB 44 built in the storage device 42, and transmits the acquired print job information to the client apparatus 16.

As a result, it is assumed that print job information having a print job name of "PrintJob_Aug2011" is acquired. In addition, "PrintJob_Aug2011" is a print job executed once in the past (August, 2011).

In step S12, the client apparatus 16 displays the setting screen 100 relevant to the profile 62 on the user interface unit 80. Prior to display, the screen creating section 94 creates display data of a window W1 (including the setting screen 100), and outputs the display data to the display unit 76. As a result, the window W1 including the setting screen 100 is displayed on the display unit 76.

Figure 7:
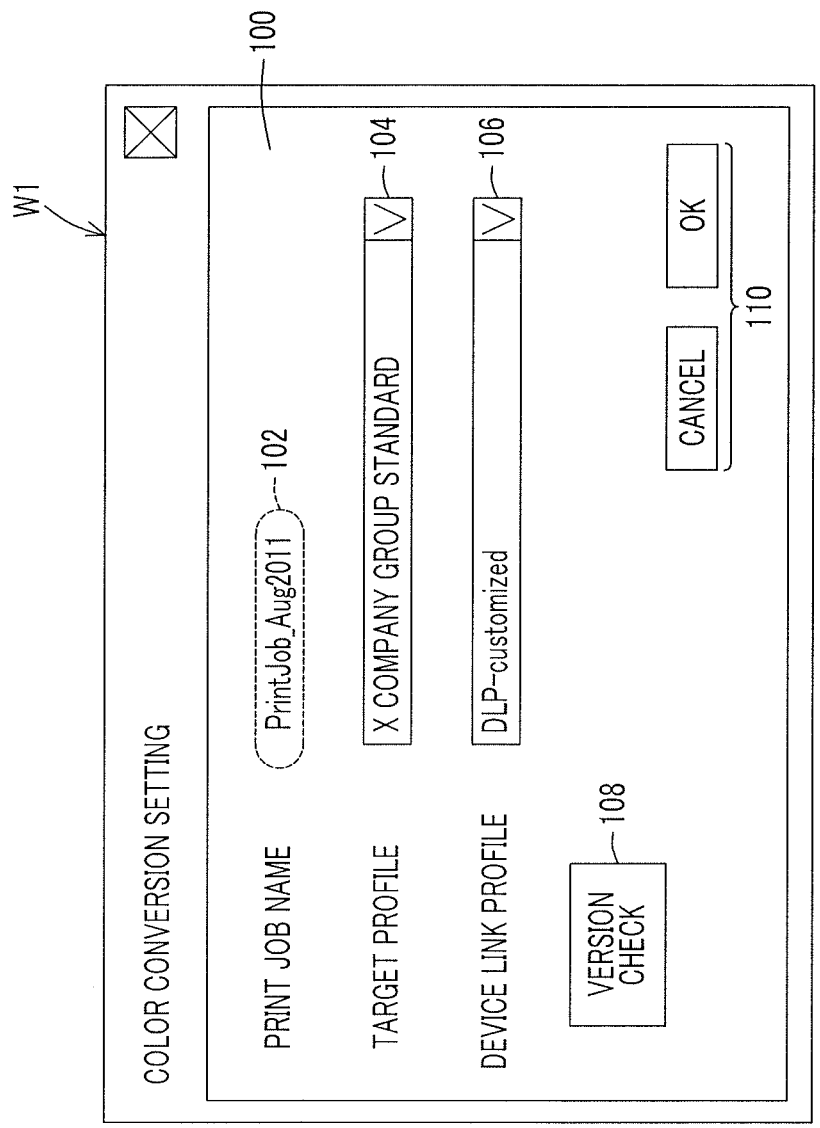
FIG. 7 is an image view showing a setting screen of the profile.

As shown in FIG. 7, a display column 102, combo boxes 104 and 106, a button 108 written as [Version Check], and a button group 110 written as [Cancel] and [OK] are arranged on the setting screen 100. The operator can perform various kinds of settings through each user control while operating the input unit 74 (refer to FIG. 4).

In step S13, the operator sets the profile 62, which is matched with the print job information acquired in step S11, through the user interface unit 80.

In the example shown in FIG. 7, the print job name (PrintJob_Aug2011) acquired in advance is written in the display column 102. In addition, a target profile whose name is "X company group standard" and a device link profile (hereinafter, referred to as a DLP) whose name is "DLP-customized" are selected through the combo boxes 104 and 106. In this case, the name specification section 90 acquires the character strings of "X company group standard" and "DLP-customized", and designates the profile 62 with these names as an object to be acquired.

In response to the operation of clicking the [Version Check] button 108 on the setting screen 100, the screen creating section 94 creates display data of a window W2 (including the check screen 120) and then outputs the display data to the display unit 76. As a result, the window W2 including the check screen 120 is newly displayed on the display unit 76.

Figure 8:
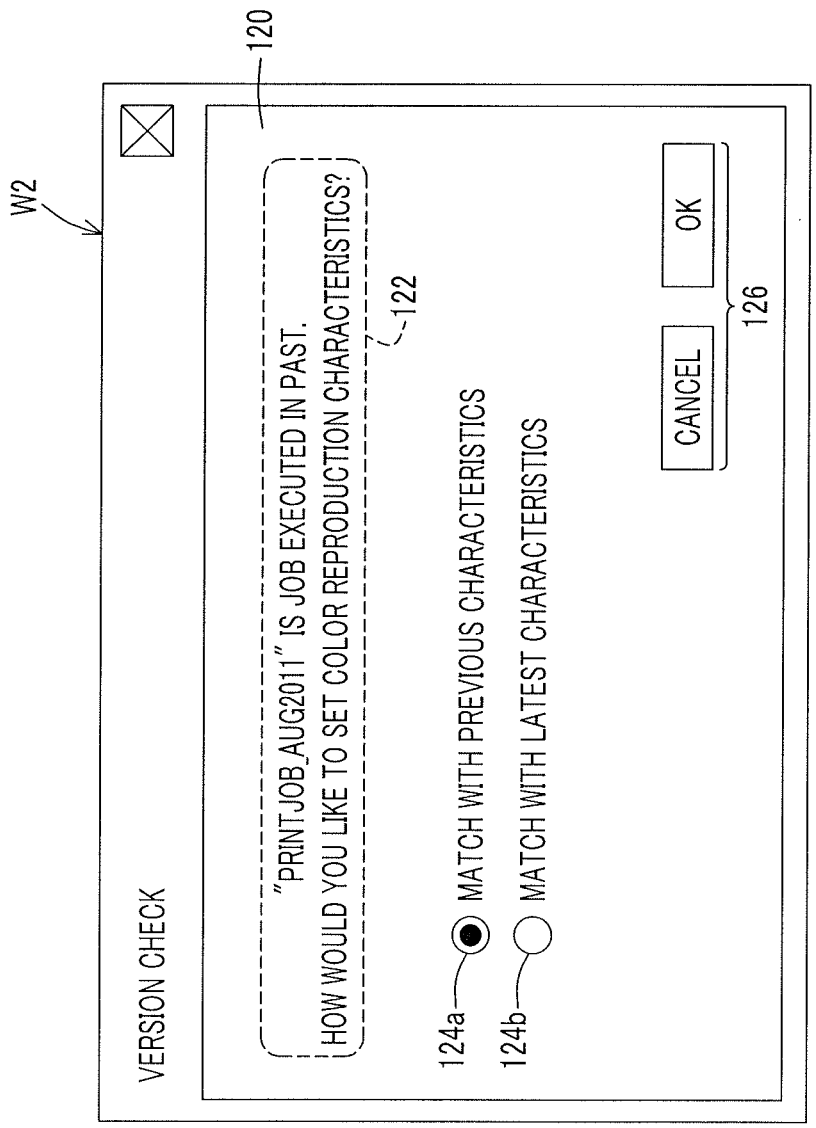
FIG. 8 is an image view showing a check screen of the version.
Figure 9:
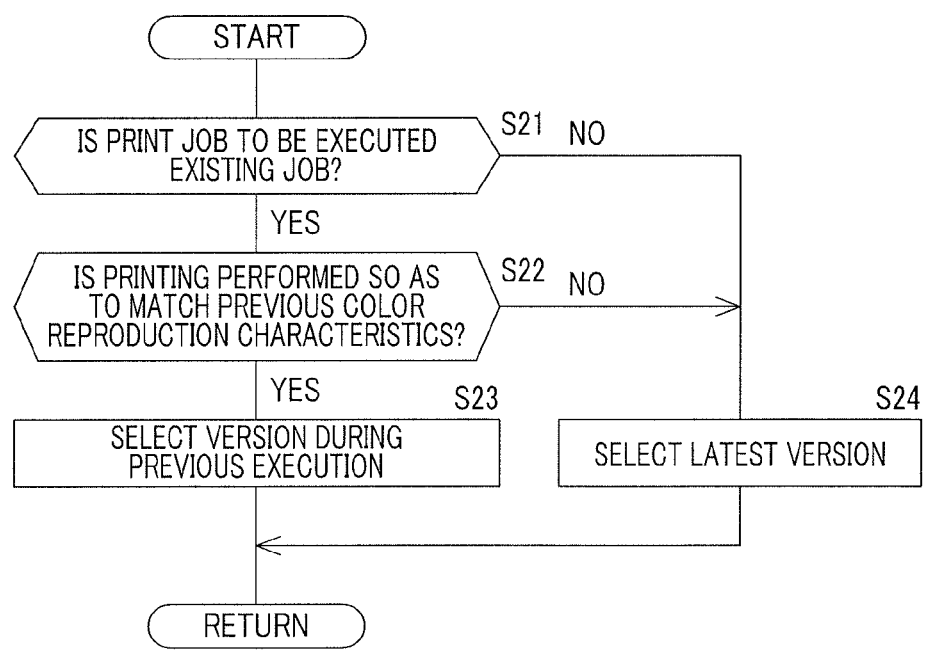
FIG. 9 is a flowchart for explaining a method of selecting a version.

As shown in FIG. 8, a message column 122, two radio buttons 124a and 124b, and a button group 126 written as [Cancel] and [OK] are arranged on the check screen 120.

In the message column 122, "PrintJob_Aug2011 is a job that has been executed in the past. How would you like to set color reproduction characteristics?" is written. On the right side of the radio buttons 124a and 124b, "match the previous characteristics" and "match the latest characteristics" are respectively written.

In step S14, the version information acquisition section 92 acquires information (hereinafter, referred to as version information) for selecting one of a plurality of versions in response to the setting operation in step S13. Specifically, the version information is acquired based on the settings when the button group 110 (in particular, [OK] button) shown in FIG. 7 is clicked. Hereinafter, the operation of the version information acquisition section 92 will be described in detail with reference to the flowchart in FIG. 9.

In step S21, the version information acquisition section 92 determines whether or not the print job, which is an object to be executed, is an "existing job" executed in the past. For example, the version information acquisition section 92 determines that the print job is an "existing job" when the number of times of job execution indicated by the print job information is 1 or more, and determines that the print job is a "new job" when the number of times of job execution indicated by the print job information is 0. When it is determined that the print job is an existing job (step S21: YES), the process proceeds to the next step S22.

In step S22, the version information acquisition section 92 determines whether or not to match the color reproduction characteristics of the print job with the previous color reproduction characteristics. Specifically, the version information acquisition section 92 performs the determination from the ON/OFF state of the two radio buttons 124a and 124b (refer to FIG. 8). When the button group 126 ([OK] button) has been clicked in a state where the radio button 124a is ON, the version information acquisition section 92 determines that the color reproduction characteristics of the print job are to be matched with the previous color reproduction characteristics (step S22: YES), and the process proceeds to the next step (S23).

In step S23, the version information acquisition section 92 acquires version information regarding the version applied at the time of previous execution. Specifically, the version information acquisition section 92 acquires identification information of the version included in the print job information, execution time of the print job, control point in time of the printed matter 38, and the like as the version information.

The process returns to step S22. Here, when the radio button 124b is ON, the version information acquisition section 92 determines that the color reproduction characteristics of the print job are to be matched with the latest color reproduction characteristics (step S22: NO). Then, the version information acquisition section 92 acquires "the latest version is selected" as version information (step S24).

Incidentally, when the print job that is an object to be executed is not "new", that is, is an "existing job" (step S21: NO), the process proceeds to step S24 and the version information acquisition section 92 acquires "the latest version is selected" as version information.

In this manner, the version information acquisition section 92 acquires the version information indicating the attributes of the print job. Here, it is assumed that matching with the previous characteristics and the execution time (August, 2011) of the print job have been acquired.

Figure 6:
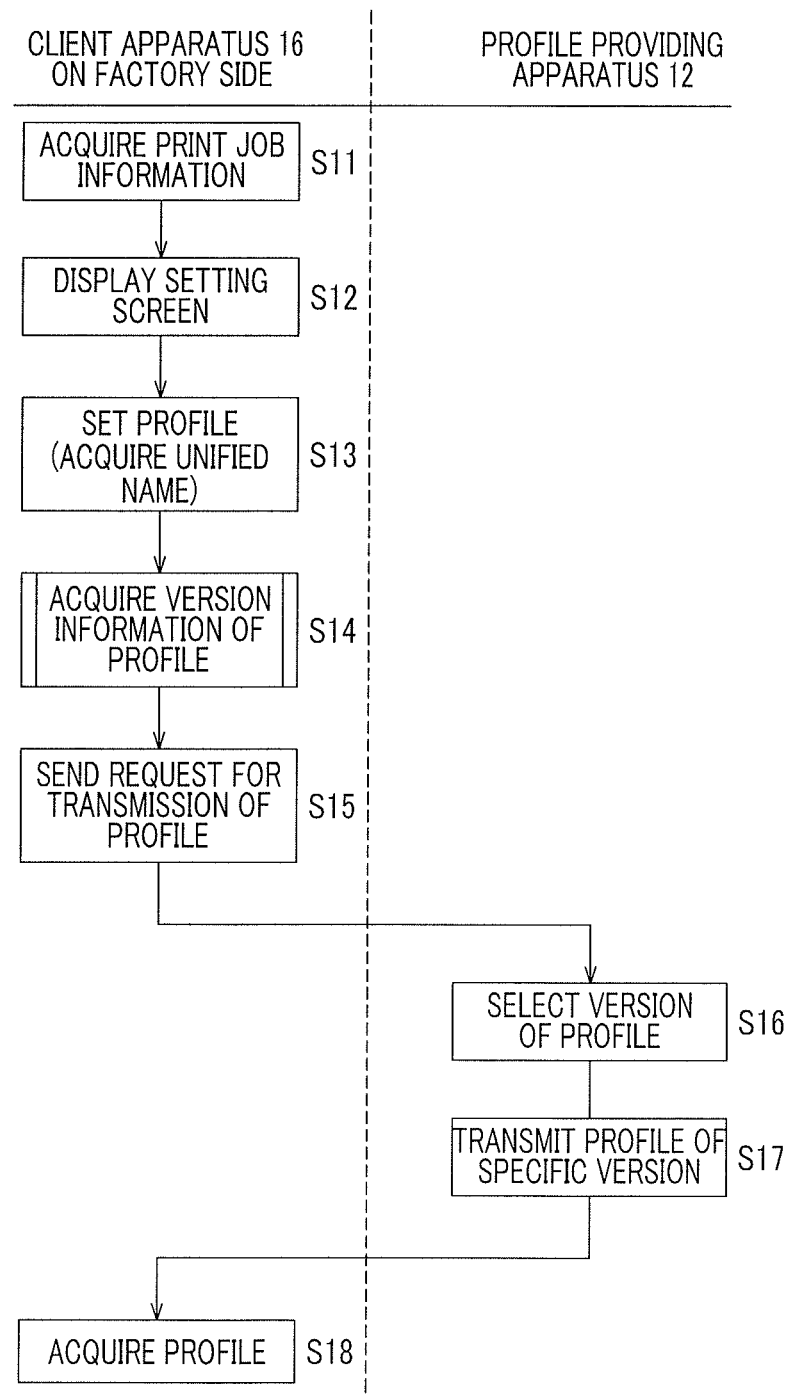
FIG. 6 is a sequence diagram relevant to the process of providing a profile.

In step S15 of FIG. 6, the client apparatus 16 transmits communication data (including the unified name and the version information), which is for requesting the transmission of the profile 62, to the profile providing apparatus 12. Then, the profile providing apparatus 12 acquires the communication data through the second communication I/F 72 (refer to FIG.

4), the network 20 (refer to FIG. 1), the LAN in factory 26a (refer to FIG. 1), and the first communication I/F 50 (refer to FIG. 3). As a result, the profile providing apparatus 12 acquires the unified name and the version information from the client apparatus 16.

In step S16, the version selecting section 58 selects one specific version among a plurality of versions based on the unified name and the version information acquired in step S15.

As shown in FIG. 3, it is assumed that "Version_1", "Version_2", "Version_3", "Version_4", and "Version_5" have been updated and registered in "May, 2009", "May, 2010", "May, 2011", "April, 2012", and "April, 2013", respectively. In this case, the version selecting section 58 selects "Version_3" that is earlier than the execution time (August, 2011) of the print job and is the latest update date (May, 2011).

That is, the version selecting section 58 selects a specific version according to the attributes of the print job to which the profile 62 is to be applied. Specifically, when the print job is newly executed, the version selecting section 58 selects the latest version. On the other hand, when the print job has been executed in the past, the version selecting section 58 selects a version that has been applied during the execution.

In addition, this selection process is not limited to the method described above, and it is possible to use various methods according to the type of version information. For example, it is possible to use a production time of the printed matter 38 instead of the execution time of the print job, or it is possible to select a version matched with a checking result based on the identification information (for example, a version name) of the version.

In step S17, the profile providing apparatus 12 transmits communication data (including the profile 62) for providing the profile 62 to the client apparatus 16. Specifically, the transmission processing section 60 transmits the profile 62 of a specific version to the client apparatus 16 so as to be associated with the unified name "X company group standard" that does not depend on the version.

In step S18, the client apparatus 16 receives the communication data transmitted in step S17, and acquires the profile 62 (hereinafter, referred to as the acquired profile 82) of the appropriate version. Specifically, the profile acquisition section 86 acquires the communication data through the first communication I/F 50 (refer to FIG. 3), the network 20 (refer to FIG. 1), the LAN in factory 26a (refer to FIG. 1), and the second communication I/F 72 (refer to FIG. 4). Then, the profile acquisition section 86 stores the acquired profile 82, of which the unified name is "X company group standard" and the version is "Version_3", in the second memory 78.

Thus, the operation relevant to the process of providing the profile 62 is ended. Then, the client apparatus 16 creates a DLP using the acquired profile 82 and an output profile (not shown), and supplies the DLP to the print server 36 together with the output data. As a result, the printed matter 38 is formed. In addition, the hue of the printed matter 38 produced in the past can be faithfully reproduced as a demand of the operator.

Effects of the First Embodiment

As described above, the profile providing apparatus 12 according to the first embodiment is an apparatus that provides the profile 62 to at least one of the client apparatuses 14 and 16 to 18.

In addition, the profile providing apparatus 12 includes the transmission processing section 60 that transmits the profile DB 22 in which the profile 62 is stored for each version, the version selecting section 58 that selects one (specific version) of a plurality of versions stored in the profile DB 22, and the profile 62 of the specific version selected by the version selecting section 58 to the client apparatuses 14 and 16 to 18 so as to be associated with the unified name that does not depend on a version.

In addition, the profile providing system 10 according to the first embodiment includes the aforementioned profile providing apparatus 12 and at least one of the client apparatuses 14 and 16 to 18 that can communicate with the profile providing apparatus 12.

Through such a configuration, it is possible to acquire and set the profile 62 with a unified name without being aware of the version difference on the client side (client apparatus 16 or the like). Therefore, it is possible to provide the profile 62 of the appropriate version while reducing the burden on the setting on the client side.

Second Embodiment

Next, a profile providing system 140 according to a second embodiment will be described with reference to FIGS. 10 to 12. In addition, the same components as in the first embodiment are denoted by the same reference numerals, and explanation thereof will be omitted.

<Overall Configuration Diagram of the Profile Providing System 140>

The profile providing system 140 has basically the same configuration as that shown in FIG. 1. In the second embodiment, a profile providing apparatus 142, a profile DB 144, and a client apparatus 146 are provided instead of the profile providing apparatus 12, the profile DB 22, and the client apparatus 16.

<Electrical Block Diagram of the Profile Providing Apparatus 142>

Figure 10:
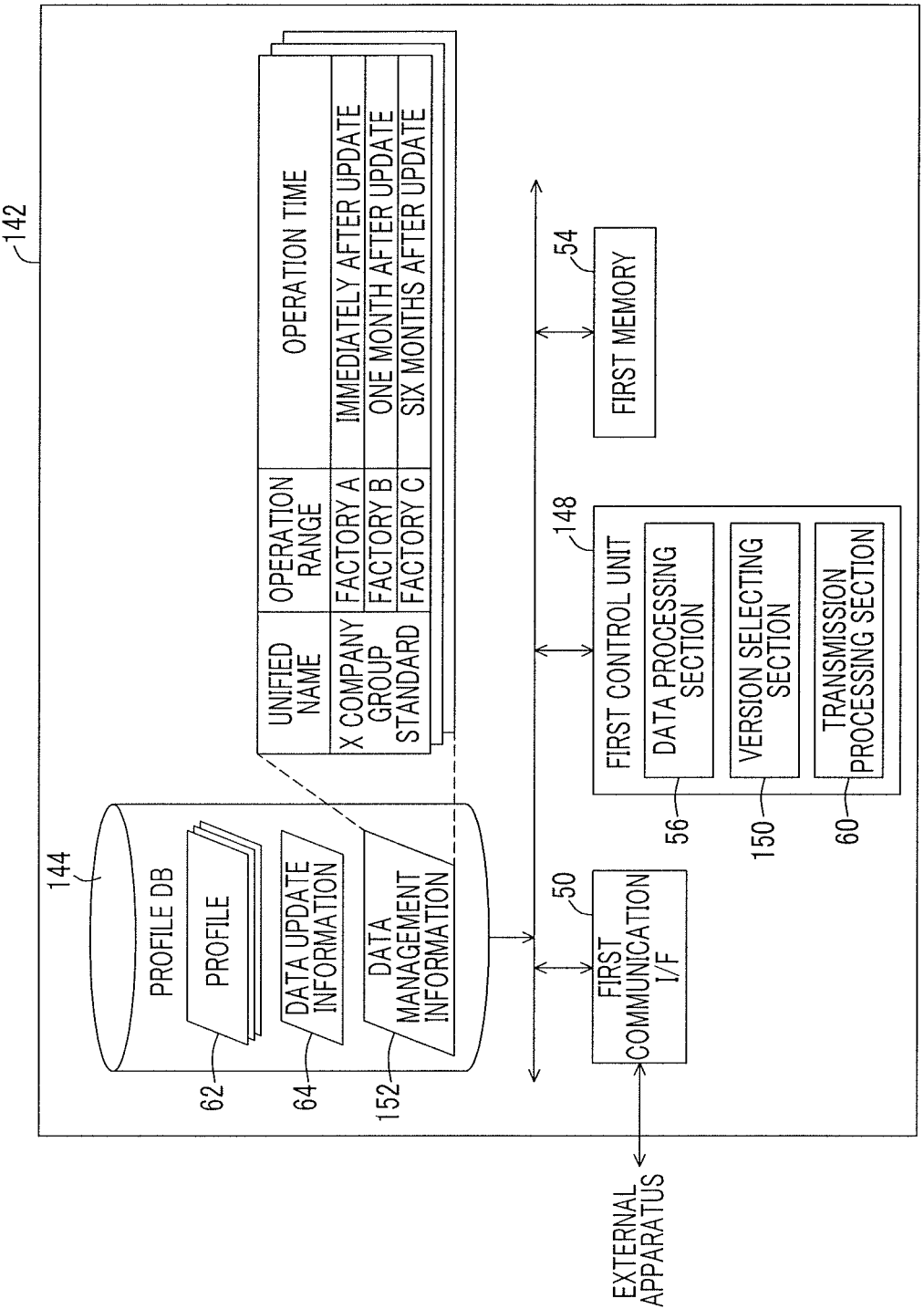
FIG. 10 is an electrical block diagram of a profile providing apparatus according to a second embodiment.

FIG. 10 is an electrical block diagram of the profile providing apparatus 142 according to the second embodiment. The profile providing apparatus 142 is a computer including not only the profile DB 144 (refer to FIG. 1) but also a first communication I/F 50, a first control unit 148, and a first memory 54.

In addition to a plurality of profiles 62 and the data update information 64 (refer to FIG. 3), data management information 152 indicating the operational conditions of each profile 62 is further stored in the profile DB 144. A unified name, an operation range, and an operation time are included in the record that is a structural unit of the data management information 152. The operational conditions are set up in advance for each version of the profile 62. In this example shown in FIG. 10, for the profile 62 (for example, latest "Version_5") whose unified name is "X company group standard", operational conditions applied to three factories (factory A, factory B, and factory C) are shown.

Similar to the first control unit 52 shown in FIG. 3, the first control unit 148 is an information processing device, such as a CPU. The first control unit 148 realizes various functions of a data processing section 56, a version selecting section 150, and a transmission processing section 60 by reading and executing a program stored in the first memory 54.

<Electrical Block Diagram of the Client Apparatus 146>

Figure 11:
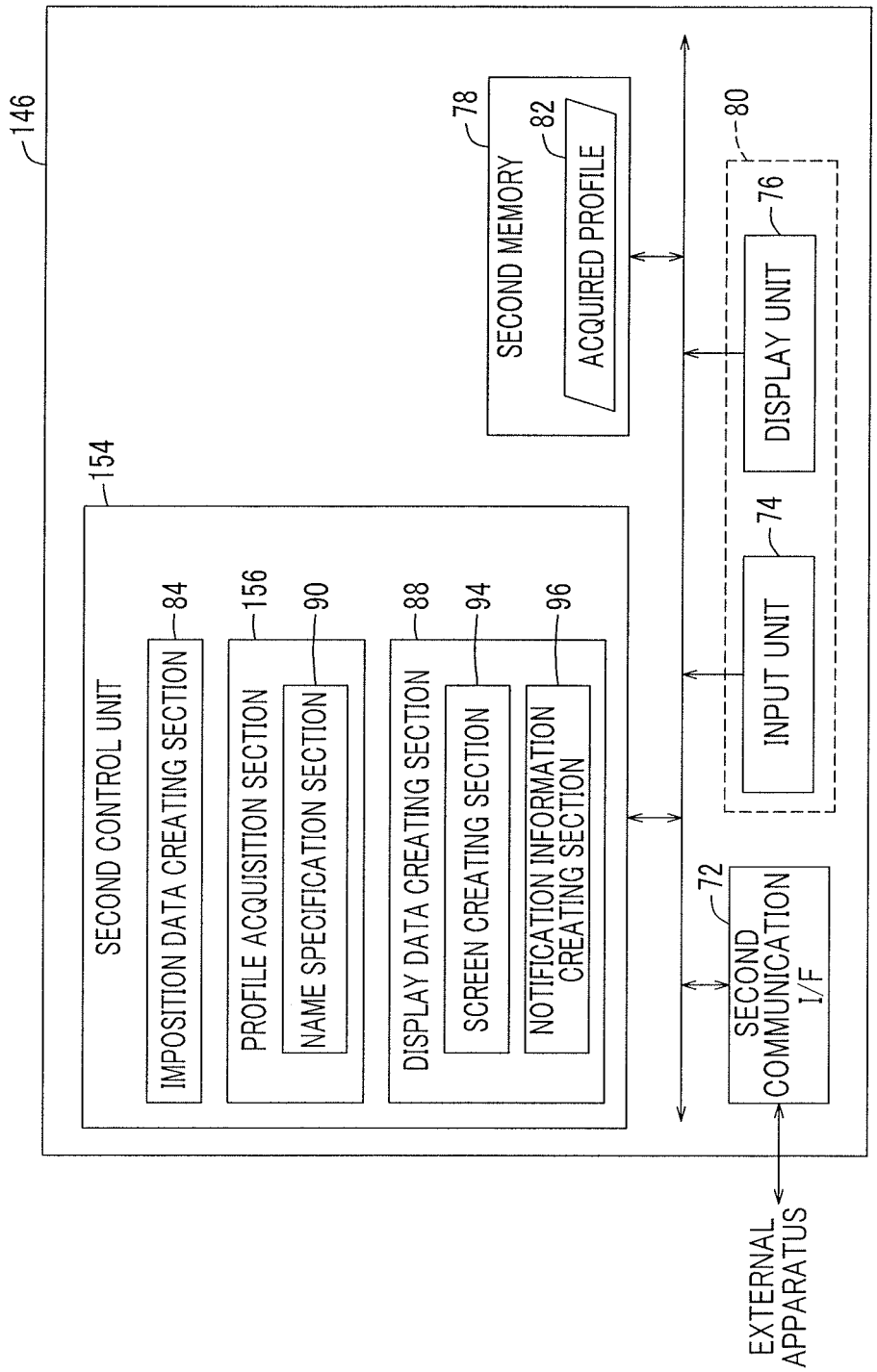
FIG. 11 is an electrical block diagram of a client apparatus according to the second embodiment.
Figure 12:
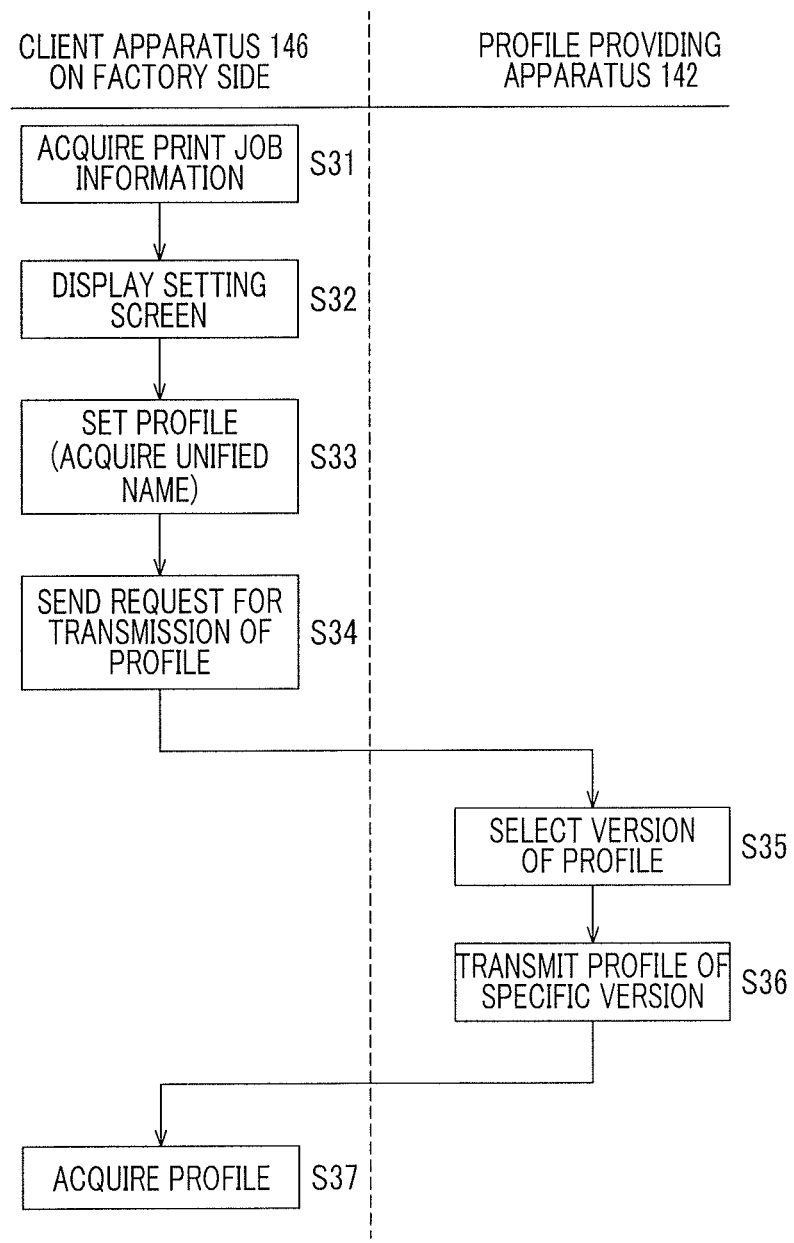
FIG. 12 is a sequence diagram relevant to the process of providing a profile.

FIG. 11 is an electrical block diagram of the client apparatus 146 according to the second embodiment. The client apparatus 146 is a computer including a second control unit 154, a second communication I/F 72, an input unit 74, a display unit 76, and a second memory 78.

Similar to the first control unit 148, the second control unit 154 is an information processing device, such as a CPU. The second control unit 154 realizes various functions of an imposition data creating section 84, a profile acquisition section 156, and a display data creating section 88 by reading and executing a program stored in the second memory 78. Here, the profile acquisition section 156 is different from the profile acquisition section 86 (refer to FIG. 4) in that the version information acquisition section 92 is omitted.

<Operation of the Profile Providing System 140>

The profile providing system 140 according to the second embodiment is configured as described above. Next, the operations (in particular, a process of providing the profile 62) of the profile providing apparatus 142 shown in FIG. 10 and the client apparatus 146 shown in FIG. 11 will be described in detail with reference mainly to the sequence diagram of FIG. 12.

In step S31, the client apparatus 146 on the factory side acquires print job information that is an object to be executed. In step S32, the client apparatus 146 displays the setting screen 100 (refer to FIG. 7) on the user interface unit 80. In step S33, the operator sets the profile 62, which is matched with the print job information, through the user interface unit 80.

In addition, since steps S31 to S33 are basically the same as those (steps S11 to S13) in the first embodiment, explanation thereof will be omitted. Here, it should be noted that the profile acquisition section 156 does not perform a process for acquiring version information.

In step S34, the client apparatus 146 transmits communication data (including the unified name of the profile 62 and the affiliation information of the client apparatus 146), which is for requesting the transmission of the profile 62, to the profile providing apparatus 142. As a result, the profile providing apparatus 142 acquires the unified name (X company group standard) and the affiliation information (factory A) from the client apparatus 146.

In step S35, the version selecting section 150 selects one specific version among a plurality of versions based on the unified name and the affiliation information acquired in step S34.

As shown in FIG. 10, it is assumed that "immediately after the update", "one month after the update", and "six months after the update" are set as the operational conditions of the latest version in "factory A", "factory B", and "factory C", respectively. In this case, the version selecting section 150 selects "Version_5" satisfying the operational conditions (belonging to "factory A" and applicable to "immediately after the update").

In step S36, the profile providing apparatus 142 transmits communication data (including the profile 62) for providing the profile 62 to the client apparatus 146. Specifically, the transmission processing section 60 transmits the profile 62 of a specific version to the client apparatus 146 so as to be associated with the unified name "X company group standard" that does not depend on the version.

In step S37, the client apparatus 146 receives the communication data transmitted in step S36, and acquires the profile 62 of the appropriate version. Then, the profile acquisition section 156 stores the acquired profile 82, of which the unified name is "X company group standard" and the version is "Version_5", in the second memory 78.

Effects of the Second Embodiment

As described above, the profile providing apparatus 142 according to the second embodiment includes the version selecting section 150 that selects a specific version according to the operational conditions (data management information 152) for each version set in advance, instead of the version selecting section 58 (refer to FIG. 3; first embodiment). Also in this configuration, the same operations and effects as in the first embodiment can be obtained.

SUPPLEMENT

The invention is not limited to the embodiments described above, and the design can be freely changed without deviating from the subject matter of the invention.

What is claimed is:

1. A profile providing apparatus for providing a color profile to at least one client apparatus, comprising:
a profile database in which the color profile is stored for each version;
a version selection unit that selects one of a plurality of versions stored in the profile database as a specific version,
wherein the version selection unit selects the specific version according to attributes of a print job to which the color profile is to be applied, and
wherein, when the print job has been executed in the past, the version selection unit selects a version applied during the execution as the specific version; and
a transmission processing unit that transmits the color profile of the specific version selected by the version selection unit to each client apparatus so as to be associated with a unified name that does not depend on the version.

2. The profile providing apparatus according to claim 1, wherein the version selection unit selects a latest version as the specific version when the print job is newly executed.

3. The profile providing apparatus according to claim 1, wherein the version selection unit selects the specific version according to operational conditions for each of the versions set in advance.

4. A profile providing system, comprising:
the profile providing apparatus according to claim 1; and
at least one client apparatus capable of communicating with the profile providing apparatus.

5. A profile providing system, comprising:
the profile providing apparatus according to claim 2; and
at least one client apparatus capable of communicating with the profile providing apparatus.

6. A profile providing system, comprising:
the profile providing apparatus according to claim 3; and
at least one client apparatus capable of communicating with the profile providing apparatus.

7. A profile providing method using a computer for providing a color profile to at least one client apparatus using a profile providing apparatus according to claim 1 having a profile database in which the color profile is stored for each version, the method comprising:
selecting one of a plurality of versions stored in the profile database as a specific version and selecting the specific version according to attributes of a print job to which the color profile is to be applied, and, when the print job has been executed in the past, selecting a version applied during the execution as the specific version; and
transmitting the color profile of the selected specific version to each client apparatus so as to be associated with a unified name that does not depend on the version.

8. A non-transitory computer readable recording medium storing a profile providing program for providing a color profile to at least one client apparatus using a profile providing apparatus according to claim 1 having a profile database in which the color profile is stored for each version, the program causing a computer to execute:

selecting one of a plurality of versions stored in the profile database as a specific version and selecting the specific version according to attributes of a print job to which the color profile is to be applied, and, when the print job has been executed in the past, selecting a version applied during the execution as the specific version; and transmitting the color profile of the selected specific version to each client apparatus so as to be associated with a unified name that does not depend on the version.

9. A profile providing apparatus for providing a color profile to at least one client apparatus, comprising:

a profile database in which the color profile is stored for each version;

a version selection unit that selects one of a plurality of versions stored in the profile database as a specific version, wherein the version selection unit selects the specific version according to attributes of a print job to which the color profile is to be applied, and wherein the version selection unit selects a latest version as the specific version when the print job is newly executed; and a transmission processing unit that transmits the color profile of the specific version selected by the version selection unit to each client apparatus so as to be associated with a unified name that does not depend on the version.

* * * * *